UNITED STATES PATENT OFFICE.

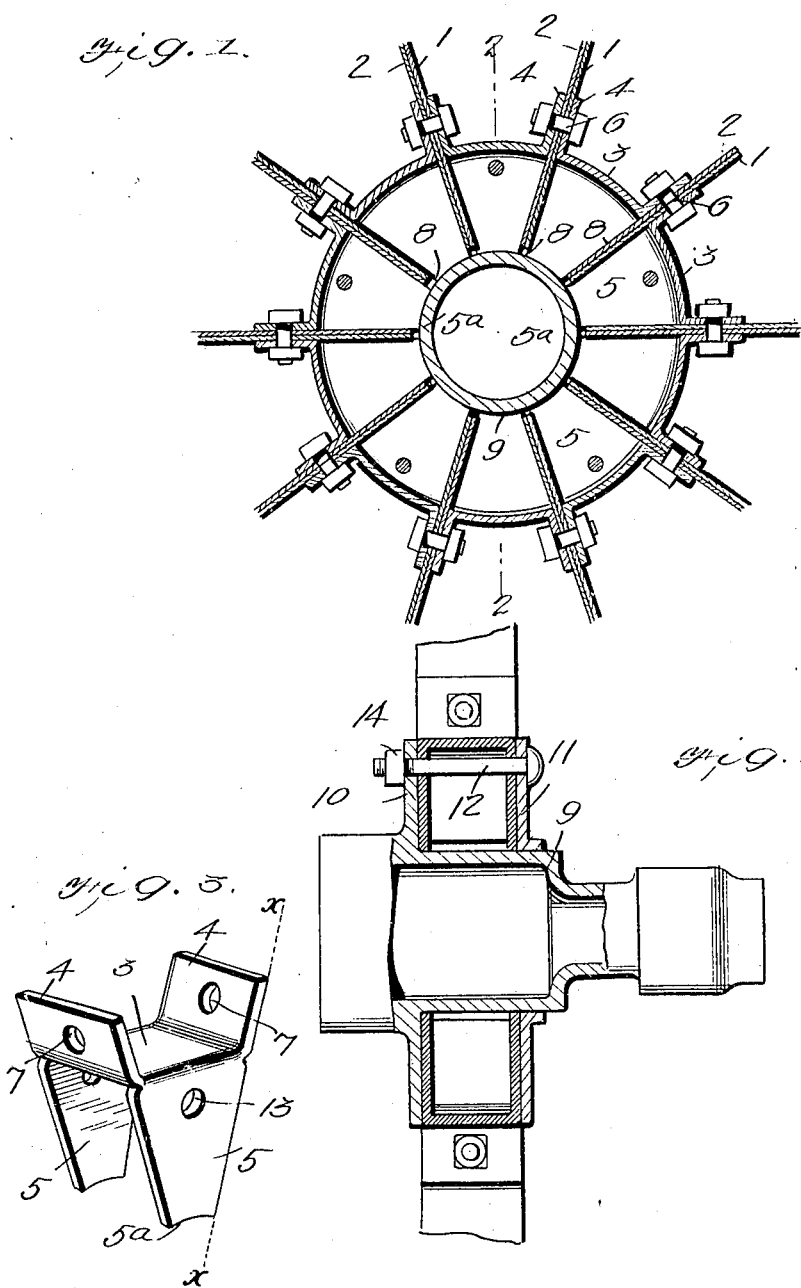

WINFIELD S. WATSON, OF CLEVELAND, OHIO.

WHEEL.

1,298,425.   Specification of Letters Patent.   Patented Mar. 25, 1919.

Application filed August 7, 1917. Serial No. 184,842.

*To all whom it may concern:*

Be it known that I, WINFIELD S. WATSON, a citizen of the United States, and a resident of Cleveland, in the county of Cuyahoga and State of Ohio, have made certain new and useful Improvements in Wheels, of which the following is a specification.

My invention relates to improvements in wheels, and more particularly to the hub construction, and the means for securing the spokes to the hub, and it consists in the combinations, constructions and arrangements herein described and claimed.

An object of my invention is to provide a wheel which is of all steel construction, and whose parts are made by stampings or punchings from steel plates.

A further object of my invention is to provide, in a hub, means for placing uniform tension in spokes, thereby equalizing vibration, shock and recoil by elongation and contraction of curved spokes arranged in pairs.

A further object of my invention is to provide a wheel which has relatively few parts, and which can be assembled quickly.

Other objects and advantages will appear in the following specification and the novel features of the invention will be particularly pointed out in the appended claims.

My invention is illustrated in the accompanying drawing, forming part of this application, in which:

Figure 1 is a section through the hub of the wheel,

Fig. 2 is a section on the line 2—2 of Fig. 1, and,

Fig. 3 is a perspective view of a filler used in the wheel construction.

In carrying out my invention I provide a series of metal spokes such as those shown at 1 and 2. These spokes are arranged in pairs, the ends of adjacent pairs being brought together. The outer ends of the spokes may be attached to a rim (not shown) in any suitable manner. The present invention deals primarily with the hub construction.

Disposed between adjacent pairs of spokes are fillers like that shown in Fig. 3. This consists of a body portion 3 having ears 4, bent laterally, and ears 5 disposed at the edges of the body portion 3 and bent in the opposite direction from the ears 4.

It will be observed that the edges of the ears 5 are in alinement with the edges of the ears 4, as for instance along the line X—X of Fig. 3. This brings the plane of the ears 5 in alinement with the surface of the contiguous edges of the ears 4. In assembling the wheel the spokes 1 and 2 are placed together, and fillers are placed on either side thereof, bolts 6 being passed through alined openings such as those shown at 7 in the ears 4, and through the spokes 1 and 2. All the spokes of the wheel are assembled in the same manner until the circle of the fillers and spokes is complete.

It will be noted that the spokes 1 and 2 terminate short of the inner ends of the ears 5 of the filler to leave a space 8. The nuts on the bolts 6 are now tightened and the structure thus far assembled is put into a boring machine or other similar device, which cuts off the inner ends 5ª of the fillers 5 to a true circle so that the assembled spokes may accurately fit over the cylindrical hub portion 9, see Fig. 2. One edge of the spokes and the fillers is arranged to abut the fixed hub flange 10, while the movable hub flange 11 abuts the other side of the wheel.

Bolts 12 extend through alined openings in the hub flanges and through openings 13 in the ears 5, nuts 14 being provided for securing the parts in position.

From the foregoing description of the various parts of the device the operation thereof may be readily understood.

The spokes have bearing surfaces extending from the ends of the filler to the outer ends of the ears 4. The fillers are held in position as far as radial and lateral movement is concerned, both by the bolts 6 and 12.

One feature of this device to which I desire to call particular attention is that it is an all steel construction, thus doing away with the necessity of using wood filler. It has great strength in proportion to the weight and is very readily assembled; moreover, when the parts are tightened up the strain is distributed evenly around the wheel, thus making it a uniform tension wheel.

The ease of assembling and interchanging parts reduces the cost of the wheel. This wheel is primarily designed for use where the requirements necessitate a strong wheel of light weight such as on aeroplanes, automobiles and vehicles of all kinds.

I claim:—

1. In a hub construction, a plurality of flat metal spokes, a central cylindrical hub member, metal fillers disposed between said spokes, each of said metal fillers comprising a body portion consisting of an arcuate plate, outwardly extending ears carried by said body portion disposed parallel with and arranged to engage abutting spokes, inwardly extending ears having faces in alinement with the contiguous outwardly extending ears and arranged to engage a portion of the spokes, the ends of the inwardly extending ears being curved to fit the cylindrical hub member, hub flanges carried by said cylindrical hub member, and bolts disposed between the body portions of the fillers and the cylindrical hub member, said bolts being arranged to extend through said inwardly extending ears and through the hub flanges for securing the fillers to the flanges.

2. In a hub construction, a plurality of flat metal spokes, a central cylindrical hub member, metal fillers disposed between said spokes, each of said metal fillers comprising a body portion consisting of an arcuate plate, outwardly extending ears carried by said body portion disposed parallel with and arranged to engage abutting spokes, inwardly extending ears having faces in alinement with the contiguous outwardly extending ears and arranged to engage a portion of the spokes, the ends of the inwardly extending ears being curved to fit the cylindrical hub member, hub flanges carried by said cylindrical hub member, bolts disposed between the body portions of the fillers and the cylindrical hub member, said bolts being arranged to extend through said inwardly extending ears and through the hub flanges for securing the fillers to the flanges, and bolts arranged to extend through the outwardly extending ears for securing them to the adjacent spokes.

3. In a hub construction, a plurality of flat metal spokes, a central cylindrical hub member, metal fillers disposed between said spokes, each of said metal fillers comprising a body portion consisting of an arcuate plate, outwardly extending ears carried by said body portion disposed parallel with and arranged to engage abutting spokes, inwardly extending ears having faces in alinement with the contiguous outwardly extending ears and arranged to engage a portion of the spokes, the ends of the inwardly extending ears being curved to fit the cylindrical hub member, hub flanges carried by said cylindrical hub member, bolts disposed between the body portions of the fillers and the cylindrical hub member, said bolts being arranged to extend through said inwardly extending ears and through the hub flanges for securing the fillers to the flanges, and a bolt arranged to extend through each pair of spokes and through the adjacent ear on each side thereof for clamping the spokes between the ears.

4. A hub construction, a plurality of pairs of flat metal spokes, metal fillers disposed between adjacent pairs of spokes, each of said fillers comprising an arc-shaped body portion having outwardly bent ears at each end, said ears extending in substantially a radial direction and being arranged to engage adjacent spokes, inwardly bent ears at the edges of the body portion between the outwardly bent ears, the plane of the inwardly bent ears being in alinement with the edges of the outwardly bent ears for providing a bearing surface for the spokes on the inwardly and outwardly bent ears, a central hub portion arranged to be engaged by the inner end of all of the fillers and bolts for clamping each pair of spokes between the ears of adjacent fillers.

5. A hub construction, a plurality of pairs of flat metal spokes, metal fillers disposed between adjacent pairs of spokes, each of said fillers comprising an arc-shaped body portion having outwardly bent ears at each end, said ears extending in substantially a radial direction and being arranged to engage adjacent spokes, inwardly bent ears at the edges of the body portion between the outwardly bent ears, the plane of the inwardly bent ears being in alinement with the edges of the outwardly bent ears for providing a bearing surface for the spokes on the inwardly and outwardly bent ears, a central hub portion arranged to be engaged by the inner end of all of the fillers, bolts for clamping each pair of spokes between the ears of adjacent fillers, a permanent hub flange, a removable hub flange, and bolts arranged to pass through alined openings in said hub flange and said fillers for clamping the fillers and spokes between the hub flanges.

WINFIELD S. WATSON.

Copies of this patent may be obtained for five cents each, by addressing the "Commissioner of Patents, Washington, D. C."